US012775247B2

(12) United States Patent
Bao

(10) Patent No.: US 12,775,247 B2
(45) Date of Patent: Oct. 27, 2026

(54) CONTROLLER

(71) Applicant: FANUC CORPORATION, Yamanashi (JP)

(72) Inventor: Chunyu Bao, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 412 days.

(21) Appl. No.: 18/547,878

(22) PCT Filed: Mar. 18, 2022

(86) PCT No.: PCT/JP2022/012721
§ 371 (c)(1),
(2) Date: Aug. 25, 2023

(87) PCT Pub. No.: WO2022/202686
PCT Pub. Date: Sep. 29, 2022

(65) Prior Publication Data

US 2024/0134322 A1 Apr. 25, 2024
US 2024/0231287 A9 Jul. 11, 2024

(30) Foreign Application Priority Data

Mar. 24, 2021 (JP) ................................ 2021-050252

(51) Int. Cl.
*G05B 13/02* (2006.01)

(52) U.S. Cl.
CPC ................................ *G05B 13/0265* (2013.01)

(58) Field of Classification Search
None
See application file for complete search history.

(56) References Cited

U.S. PATENT DOCUMENTS 7,684,879 B2 * 3/2010 Yutkowitz ............ G05B 13/042 700/28
8,463,477 B2 * 6/2013 Kretschmer ............ B60L 15/20 701/41

(Continued)

FOREIGN PATENT DOCUMENTS

CN 107944085 A 4/2018
CN 108168548 A 6/2018

(Continued)

OTHER PUBLICATIONS

International Search Report in PCT/JP2022/012721, mailed May 31, 2022, 2pp.

*Primary Examiner* — Jason Lin
(74) *Attorney, Agent, or Firm* — HAUPTMAN HAM, LLP

(57) ABSTRACT

A controller acquires data related to a mechanical configuration, data related to a workpiece, and data related to an operating condition of an industrial machine, and creates machine learning data used for processing of machine learning based on the acquired data. A command is given to perform processing of machine learning for estimating data related to tension in a conveying section of the industrial machine based on the created machine learning data. Then, processing of machine learning for estimating data related to tension in the conveying section is performed based on this command. In this way, the controller can adjust tension of the conveying section according to a designated condition during actual operation without a tension sensor.

5 Claims, 6 Drawing Sheets

(56) References Cited

U.S. PATENT DOCUMENTS

| | | | | |
|---|---|---|---|---|
| 11,025,185 | B2 * | 6/2021 | Jusuf | H02P 21/18 |
| 2002/0062194 | A1 * | 5/2002 | Kliman | G01H 1/003 702/35 |
| 2007/0093976 | A1 * | 4/2007 | Nishizawa | G05B 23/0283 702/56 |
| 2007/0268068 | A1 | 11/2007 | Yutkowitz | |
| 2016/0194154 | A1 | 7/2016 | Matsuzaki et al. | |
| 2018/0281256 | A1 * | 10/2018 | Asaoka | G06N 3/08 |
| 2018/0365771 | A1 | 12/2018 | Kilburn | |
| 2018/0373221 | A1 * | 12/2018 | Nakamura | G05B 19/237 |
| 2019/0033850 | A1 | 1/2019 | B R et al. | |
| 2019/0361340 | A1 | 11/2019 | Yu et al. | |
| 2020/0230981 | A1 | 7/2020 | Gunji | |
| 2020/0403539 | A1 | 12/2020 | Fukushima | |
| 2021/0103267 | A1 * | 4/2021 | Hu | G06N 20/00 |
| 2021/0132579 | A1 * | 5/2021 | Asaoka | G06N 20/00 |
| 2021/0348974 | A1 | 11/2021 | Sekiguchi et al. | |
| 2022/0154430 | A1 | 5/2022 | Kim et al. | |

FOREIGN PATENT DOCUMENTS

| | | | |
|---|---|---|---|
| CN | 109308035 | A | 2/2019 |
| CN | 111452515 | A | 7/2020 |
| CN | 112117944 | A | 12/2020 |
| KR | 10-1930066 | B1 | 12/2018 |
| KR | 10-2020-0109459 | A | 9/2020 |
| TW | 202035201 | A | 10/2020 |
| WO | 2014103886 | A1 | 7/2014 |
| WO | 2018158828 | A1 | 9/2018 |

* cited by examiner

CONTROLLER

RELATED APPLICATIONS

The present application is a National Phase of International Application No. PCT/JP2022/012721 filed Mar. 18, 2022, which claims priority to Japanese Application No. 2021-050252, filed Mar. 24, 2021.

TECHNICAL FIELD

The present invention relates to a controller for controlling an industrial machine having a substantially belt-shaped conveying section that conveys a workpiece by driving rollers.

BACKGROUND ART

A plurality of industrial machines such as machine tools, robots, and conveying machines is installed in a manufacturing site such as a factory. A conveying machine serves a function of conveying a workpiece in a factory line. FIG. 6 is a diagram illustrating a schematic configuration of a conveyor that drives rollers to convey a workpiece.

A conveyor 300 includes a plurality of rollers 301 and a conveyor belt 302 stretched around the rollers 301. For example, the conveyor belt 302 is conveyed in a conveying direction by some of the rollers 301 rotatably driven by a motor (not illustrated). A tension sensor 303 detects tension generated in the conveyor belt 302 during conveyance. While the conveyor 300 is driven, the tension of the conveyor belt 302 is adjusted by a tension adjusting mechanism 304 such as a tension roller so that no slippage occurs between the rollers 301 and the conveyor belt 302 and no excessive tension occurs in the conveyor belt 302. In the conveyor 300 illustrated in FIG. 6, a workpiece 305 is placed on the conveyor belt 302 and conveyed.

When target tension $T_{aim}$ is set in the controller of the conveyor 300, a tension deviation $\Delta T$, which is a difference between the target tension $T_{aim}$ and measured tension $T_{FBK}$ detected by the tension sensor 303, is calculated. Then, a tension/torque conversion circuit 310 calculates target torque $Q_{aim}$ based on the target tension $T_{aim}$ and the tension deviation $\Delta T$. Meanwhile, mechanical loss torque $Q_L$ for compensating for mechanical loss that occurs due to aging of the machine (wear, or the like) and acceleration/deceleration torque $Q_F$ for compensating for a motor output voltage required for acceleration/deceleration are calculated by a mechanical loss torque compensation circuit 320 and an acceleration/deceleration torque compensation circuit 330, respectively.

In this way, in a conveying device such as a conveyor that conveys a workpiece, a state of conveyance is detected using a tension sensor or the like, and tension of a conveyor belt or the like is adjusted according to the detected state (for example, Patent Document 1, and so on.).

CITATION LIST

Patent Document

Patent Document 1: WO 2014/103886 A1

SUMMARY OF THE INVENTION

Problem to be Solved by the Invention

An industrial machine uses many sensors to detect a drive status of each part. In this case, there is a demand from fields to reduce the cost of the entire industrial machine by reducing the number of sensors used. In addition, reducing the number of sensors leads to reduction in malfunctions of the industrial machine caused by sensor failures.

For this reason, there is a demand for technology that enables tension adjustment according to a designated condition without a tension sensor during actual operation.

Means for Solving Problem

A controller according to the present invention solves the above problem by using a machine learning device instead of a tension sensor to calculate torque of each axis according to a designated condition. In this specification, a substantially belt-shaped member used for conveying a workpiece in a conveying device such as a belt conveyor is referred to as a conveying section. At the time of learning of the machine learning device, data related to a mechanical configuration of a conveying machine, data related to a workpiece to be conveyed, data related to an operating condition of the machine or the like are set as data indicating an operating state of the machine, and a correlation between the data and a tension value of the conveying section detected by the tension sensor is learned. Further, during actual operation, the tension value of the conveying section is estimated by the machine learning device instead of the tension sensor, and tension of a conveyor belt or the like in the conveying machine is adjusted based on an estimation result thereof.

Further, an aspect of the present invention is a controller for controlling an industrial machine including a substantially belt-shaped conveying section that conveys a workpiece by driving a roller, the controller including a data acquisition unit that acquires data related to a mechanical configuration, data related to a workpiece, and data related to an operating condition related to an operating state of the industrial machine, an acquired data storage unit that stores data related to a mechanical configuration, data related to a workpiece, and data related to an operating condition related to an operating state of the industrial machine acquired by the data acquisition unit, a machine learning data creation unit that creates machine learning data used for processing of machine learning based on data stored in the acquired data storage unit, a machine learning processing command unit that commands performance of processing of machine learning for estimating data related to tension in the conveying section based on data created by the machine learning data creation unit, and a machine learning unit that performs processing of machine learning for estimating data related to tension in the conveying section based on a command from the machine learning processing command unit.

Effect of the Invention

According to an aspect of the present invention, it is possible to more appropriately output tension between axes without a tension sensor, and to reduce the cost (including maintenance cost) of the tension sensor required in conventional tension control.

MODE(S) FOR CARRYING OUT THE INVENTION

Hereinafter, embodiments of the invention will be described with reference to the drawings.

Figure 1:
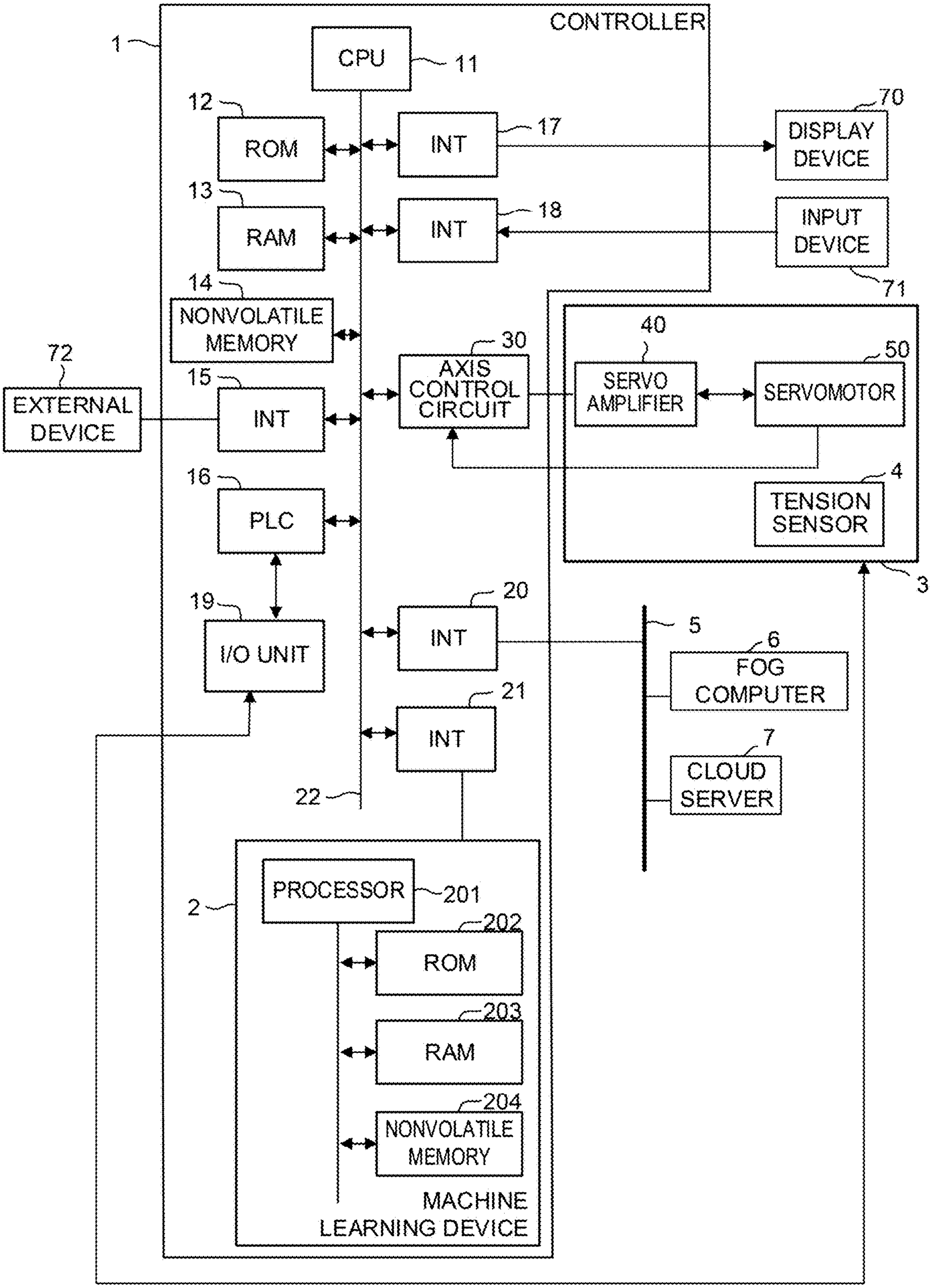
FIG. 1 is a schematic hardware configuration diagram of a controller according to one embodiment.

FIG. 1 is a schematic hardware configuration diagram illustrating main parts of a controller according to an embodiment of the present invention. For example, the controller 1 of the present invention has a function of controlling an industrial machine 3 such as a conveying machine. In this embodiment, configurations of the controller 1 and the industrial machine 3 at a stage of performing machine learning in a machine learning device 2 are illustrated.

A CPU 11 included in the controller 1 according to this embodiment is a processor that controls the entire controller 1. The CPU 11 reads a system program stored in a ROM 12 via a bus 22, and controls the entire controller 1 according to the system program. Temporary calculation data or display data, various data input from the outside or the like are temporarily stored in a RAM 13.

For example, a nonvolatile memory 14 includes a memory backed up by a battery (not illustrated), a solid state drive (SSD) or the like, and retains a storage state even when power of the controller 1 is turned off. The nonvolatile memory 14 stores control programs or data read from an external device 72 via an interface 15, control programs or data input from an input device 71 via an interface 18, control programs or data acquired from another device such as a fog computer 6 or a cloud server 7 via a network 5 or the like. For example, the data stored in the nonvolatile memory 14 may include data related to a mechanical configuration of the industrial machine 3, data related to a workpiece to be conveyed, data related to an operating condition of the machine, tension value data of a conveyor belt or the like detected by a tension sensor 4, other data related to each physical quantity detected by a sensor (not illustrated) attached to the industrial machine 3 or the like. The control programs or data stored in the nonvolatile memory 14 may be loaded in the RAM 13 during execution or use. Further, various system programs such as well-known analysis programs are written to the ROM 12 in advance.

One or a plurality of tension sensors 4 attached to the industrial machine 3 detects tension of the conveyor belt of the industrial machine 3 or the like. The tension sensor 4 may be a force sensor that detects a reaction force when a force is applied to the conveyor belt, or may be a sensor that detects the tension of the conveyor belt by sound waves in a non-contact manner. The tension sensor 4 is required when the controller 1 operates in a learning mode, but is not required when the controller 1 operates in an actual operation mode.

The interface 15 is an interface for connecting the CPU 11 of the controller 1 and the external device 72 such as an external storage medium or the like to each other. From the external device 72 side, for example, a control program, setting data or the like used for controlling the industrial machine 3 are read. In addition, a control program, setting data or the like edited in the controller 1 may be stored in an external storage medium (not illustrated) such as a CF card or a USB memory via the external device 72. A programmable logic controller (PLC) 16 executes a ladder program to control the industrial machine 3 and peripheral devices of the industrial machine 3 (for example, a tool changer, an actuator such as a robot, and sensors such as the tension sensor 4 attached to the industrial machine 3, a temperature sensor, and a humidity sensor) by outputting signals thereto via an I/O unit 19. In addition, the PLC 16 receives signals of various switches of an operation panel provided on a main body of the industrial machine 3, the peripheral devices or the like, performs signal processing necessary therefor, and then transfers the signals to the CPU 11.

An interface 20 is an interface for connecting the CPU 11 of the controller 1 and the wired or wireless network 5 to each other. For example, the network 5 may perform communication using techniques such as serial communication such as RS-485, Ethernet (registered trademark) communication, optical communication, wireless LAN, Wi-Fi (registered trademark), and Bluetooth (registered trademark). The network 5 is connected to a controller for controlling other industrial machine, and high-level management devices such as the fog computer 6 and the cloud server 7 to mutually exchange data with the controller 1.

Each piece of data read onto a memory, data obtained as a result of executing a program or the like are output to a display device 70 via an interface 17 and displayed thereon. In addition, the input device 71 including a keyboard, a pointing device or the like, transfers commands, data or the like based on operations by an operator to the CPU 11 via the interface 18.

A axis control circuit 30 for driving a driving unit provided in the industrial machine 3 receives movement command amounts from the CPU 11, and outputs movement commands to servo amplifiers 40, respectively. The servo amplifiers 40 receive the commands and drive servomotors 50 of the industrial machine 3, respectively. Each of the servomotors 50 incorporates a position/speed detector, and feeds back a position/speed feedback signal from this position/speed detector to the axis control circuit 30 to perform position/speed feedback control. Even though only one axis control circuit 30, one servo amplifier 40, and one servomotor 50 are illustrated in the hardware configuration diagram of FIG. 1, the number of prepared axis control circuits 30, the number of prepared servo amplifiers 40, the same number of driving units as those provided in the industrial machine 3 to be controlled are prepared in practice.

An interface 21 is an interface for connecting the CPU 11 and the machine learning device 2 to each other. The machine learning device 2 includes a processor 201 that controls the entire machine learning device 2, a ROM 202 that stores a system program or the like, a RAM 203 for performing temporary storage in each process related to machine learning, and a nonvolatile memory 204 used for storage of a learning model or the like. The machine learning device 2 can observe data acquirable by the controller 1 via the interface 21 (for example, data related to a mechanical configuration, data related to a workpiece to be conveyed, data related to an operating condition of the machine, tension value data of the conveyor belt or the like detected by the tension sensor 4, or the like). In addition, the controller 1 acquires a processing result output from the machine learning device 2 via the interface 21, and stores the acquired result, displays the acquired result, or transmits the acquired result to another device via the network 5 or the like. Even though the machine learning device 2 is built in the controller 1 in FIG. 1, the machine learning device 2 may be externally connected to the controller 1 via a predetermined interface.

Figure 2:
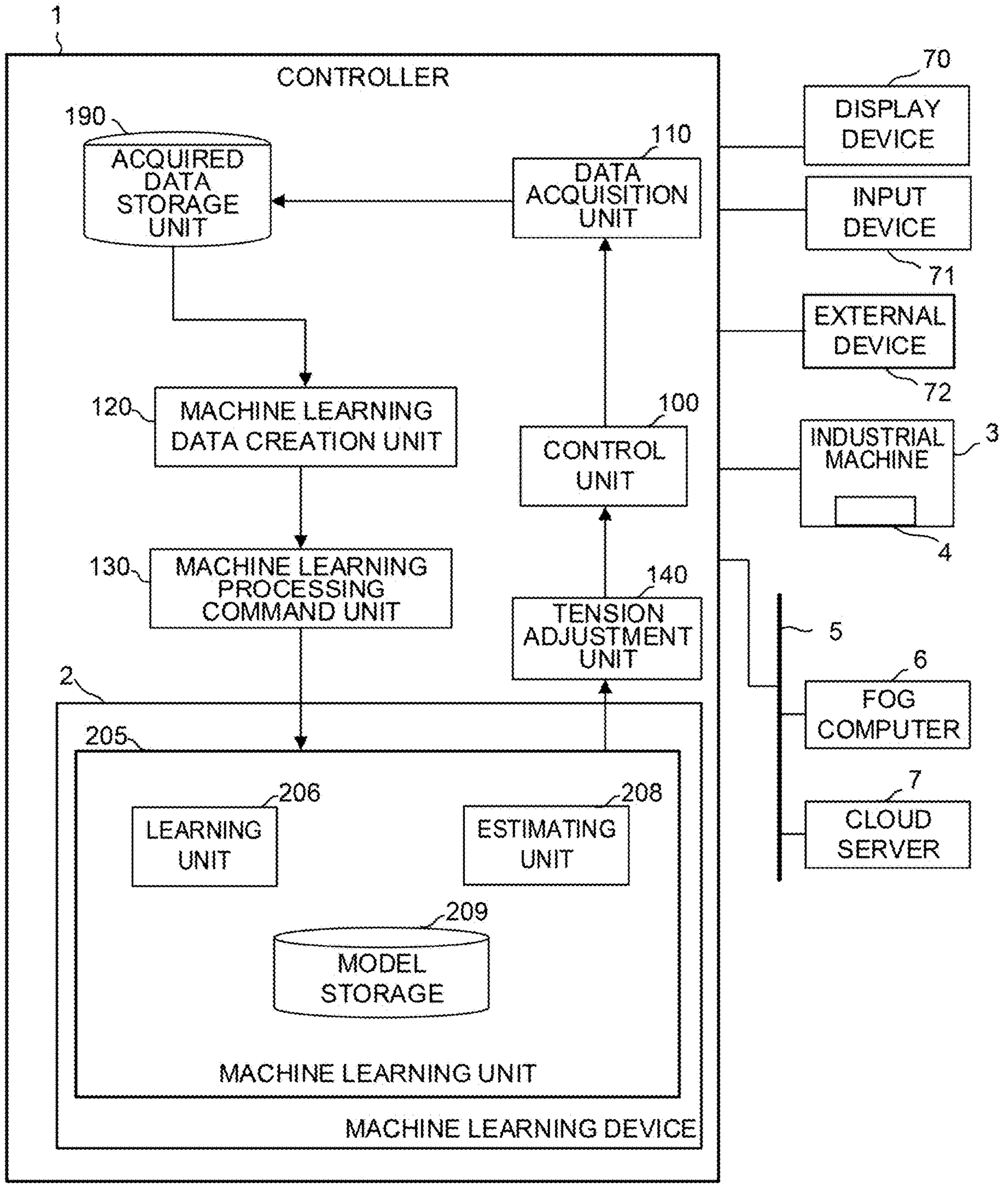
FIG. 2 is a schematic block diagram illustrating functions of a controller according to a first embodiment.

FIG. 2 illustrates functions of a controller 1 according to a first embodiment of the present invention as a schematic block diagram. Each of the functions of the controller 1 according to this embodiment is realized by each of the CPU 11 provided in the controller 1 and the processor 201 provided in the machine learning device 2 illustrated in FIG. 1 executing a system program and controlling the operation of each unit of the controller 1 and the machine learning device 2.

The controller 1 of this embodiment includes a control unit 100, a data acquisition unit 110, a machine learning data creation unit 120, a machine learning processing command unit 130, and a tension adjustment unit 140. In addition, a machine learning unit 205 that constitutes the machine learning device 2 includes a learning unit 206 and an estimating unit 208. Further, the RAM 13 or the nonvolatile memory 14 of the controller 1 includes an acquired data storage unit 190, which is an area for storing data acquired from the industrial machine 3, and a model storage 209 serving as an area for storing a learning model created by the learning unit 206 is prepared in advance on the RAM 203 or the nonvolatile memory 204 of the machine learning device 2.

Figure 6:
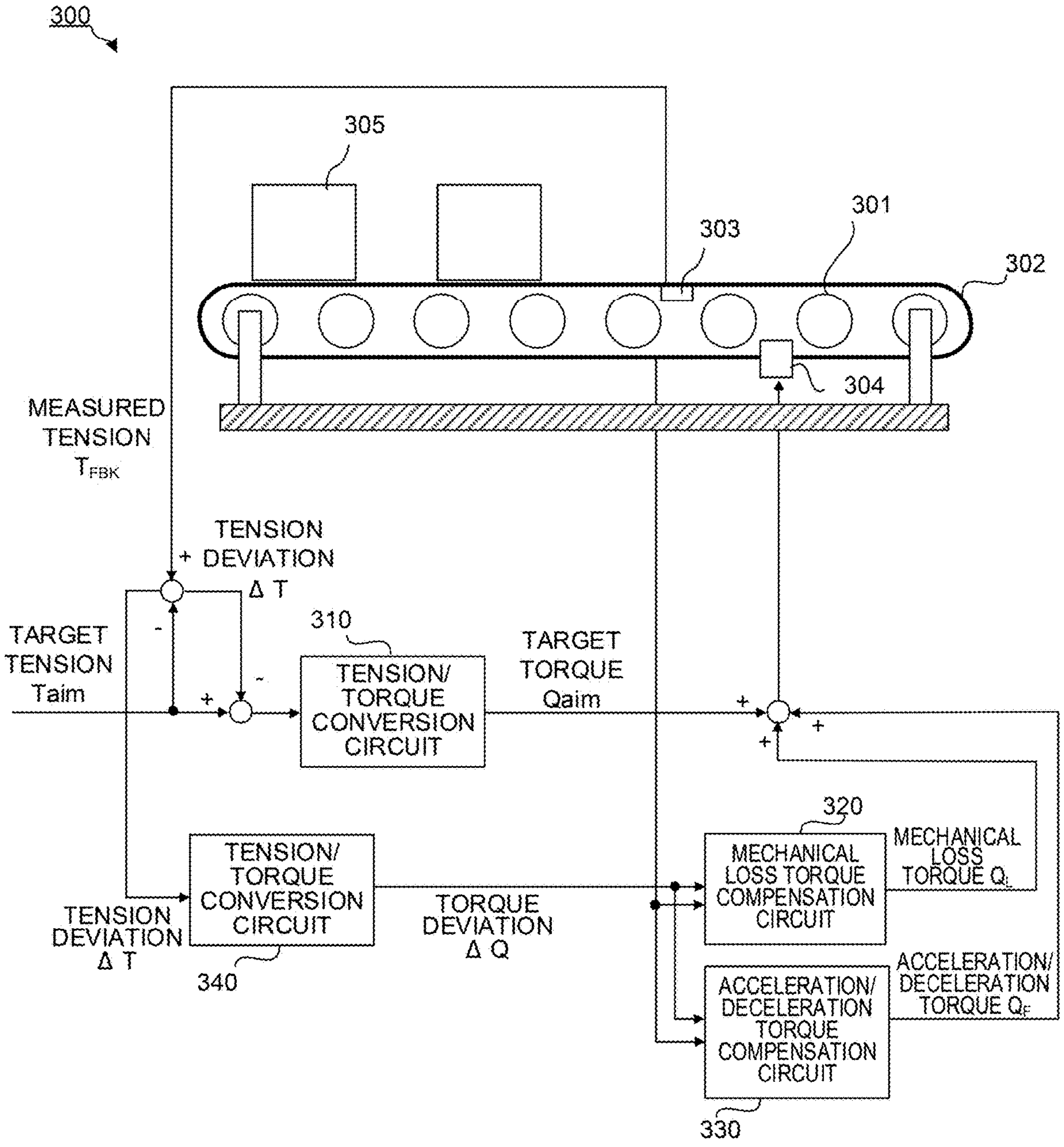
FIG. 6 is a diagram illustrating an example of a conveying machine according to conventional technology.

The control unit 100 controls an operation of the industrial machine 3 based on a preset operating condition and a control program. For example, the control unit 100 has general functions required to control the operation of the industrial machine 3, as illustrated in FIG. 6 or the like. The control unit 100 controls the operation of the industrial machine 3 while referring to a measured speed, measured tension, or the like fed back from the industrial machine 3 according to a feed speed, acceleration, target tension, or the like designated by the operating condition, the control program, or the like.

The data acquisition unit 110 acquires data $I_s$ related to the mechanical configuration of the industrial machine 3, data $I_W$ related to the workpiece to be conveyed, data $I_c$ related to the operating condition of the machine, and tension value data $O_t$ of the conveyor belt or the like detected by the tension sensor 4 attached to the industrial machine 3 from, for example, the control unit 100. The data acquisition unit 110 may collectively acquire data related to a warning generated in the industrial machine 3 and input value data input by an operator via the input device 71. Further, the data acquisition unit 110 may acquire data related to the operation of the industrial machine 3 acquired and stored by the external device 72, the fog computer 6, the cloud server 7, or the like. The data acquired by the data acquisition unit 110 is at least data related to an operating state of the industrial machine 3 during operation.

The data $I_s$ related to the mechanical configuration acquired by the data acquisition unit 110 includes, for example, the number of axes of the industrial machine 3 (the number of rotors to be driven or the like), a distance between respective axes, whether or not a axis is a gravity axis, a direction of movement, a diameter of the roller, a type or material of the conveyor belt, or the like. In addition, the data $I_W$ related to the workpiece includes a material, a thickness, a weight, a shape, or the like of the workpiece. Further, the data $I_c$ related to the operating condition includes a feed speed, acceleration, a total operating time, a total operating distance, or the like. The tension value data $O_t$ is a tension value detected by the tension sensor 4 attached to the industrial machine 3 when data related to each operating state is acquired. The tension value data $O_t$ may include a plurality of tension values measured by the plurality of tension sensors 4. Each piece of the data is collected and stored in the acquired data storage unit 190 for each acquisition or detection timing.

The machine learning data creation unit 120 creates training data used for processing of machine learning related to tension value adjustment by the machine learning unit 205 based on the data stored in the acquired data storage unit 190. More specifically, when the controller 1 operates in the learning mode, the machine learning data creation unit 120 creates training data used for learning processing by the machine learning unit 205 based on the data stored in the acquired data storage unit 190. The training data created by the machine learning data creation unit 120 is data obtained by associating the tension value data $O_t$ of the conveyor belt or the like detected by the tension sensor 4 with at least the data $I_s$ related to the mechanical configuration, the data $I_W$ related to the workpiece, and the data $I_c$ related to the operating condition. The training data created by the machine learning data creation unit 120 may further include additional data according to a machine learning technique of the machine learning unit 205.

On the other hand, when the controller 1 operates in the actual operation mode, the machine learning data creation unit 120 creates estimation data used for estimation processing by the estimating unit 208 based on the data stored in the acquired data storage unit 190. The estimation data created by the machine learning data creation unit 120 includes at least the data $I_s$ related to the mechanical configuration, the data $I_W$ related to the workpiece, and the data $I_c$ related to the operating condition. The estimation data created by the machine learning data creation unit 120 may further include additional data according to a machine learning method of the machine learning unit 205.

Based on the data created by the machine learning data creation unit 120, the machine learning processing command unit 130 commands the machine learning unit 205 to perform processing of machine learning related to estimation of data related to tension. More specifically, when the controller 1 operates in the learning mode, for example, the machine learning processing command unit 130 commands the machine learning unit 205 to learn a correlation of the data $I_s$ related to the mechanical configuration, the data $I_W$ related to the workpiece, and the data $I_c$ related to the operating condition with the tension value data $O_t$ of the conveyor belt, or the like detected by the tension sensor 4 or adjustment action data of a tension value based on the training data created by the machine learning data creation unit 120.

Meanwhile, when the controller 1 operates in the actual operation mode, for example, the machine learning processing command unit 130 commands the machine learning unit 205 to estimate an adjustment action of the tension value or the tension value using the data $I_s$ related to the mechanical configuration, the data $I_W$ related to the workpiece, and the data $I_c$ related to the operating condition based on estimation data created by the machine learning data creation unit 120.

The tension adjustment unit 140 commands the control unit 100 to perform an action for adjusting the tension value based on data related to tension estimated by the machine learning unit 205 (the tension value itself, the adjustment action of the tension value, or the like). For example, when the tension value is estimated by the machine learning unit 205, the tension adjustment unit 140 commands the control unit 100 to perform an action for adjusting the estimated tension value to a target tension value. In addition, for example, when the adjustment action of the tension value is estimated by the machine learning unit 205, the tension adjustment unit 140 commands the control unit 100 to perform the estimated adjustment action. Note that the tension adjustment unit 140 is not necessarily a necessary component when the controller 1 operates in the learning mode.

The learning unit 206 provided in the machine learning unit 205 creates a model that has learned data related to tension of the conveyor belt or the like with respect to the operating state of the industrial machine 3 based on training data included in a command received from the machine learning processing command unit 130, and stores the created model in the model storage 209 based on the training data received from the machine learning processing command unit 130. More specifically, for example, when performing supervised learning, the learning unit 206 creates a model that has learned a correlation of the tension value data $O_t$ of the conveyor belt or the like detected by the tension sensor 4 with data such as the data $I_s$ related to the mechanical configuration, the data $I_W$ related to the workpiece, and the data $I_s$ related to the operating condition indicating the operating state of the industrial machine 3. Alternatively, when performing reinforcement learning, for example, the learning unit 206 creates a model that has learned a correlation of the adjustment action of the tension value of the conveyor belt or the like detected by the tension sensor 4 with data such as the data $I_s$ related to the mechanical configuration, the data $I_W$ related to the workpiece, and the data $I_s$ related to the operating condition indicating the operating state of the industrial machine 3.

The machine learning performed by the learning unit 206 may be known supervised learning or reinforcement learning. The model created by the learning unit 206 enables estimation of data related to tension of the conveyor belt or the like (a tension value itself or an adjustment action of the tension value) with respect to the data $I_s$ related to the mechanical configuration, the data $I_W$ related to the workpiece, and the data $I_s$ related to the operating condition by performing machine learning. Examples of the model created by the learning unit 206 include a regression learning unit and a multilayer neural network, or the like.

The estimating unit 208 provided in the machine learning unit 205 performs estimation processing of data related to tension using a model stored in the model storage 209 (a tension value itself or an adjustment action of the tension value) based on estimation data received from the machine learning processing command unit 130. The estimation processing performed by the estimating unit 208 may be estimation processing based on known supervised learning or reinforcement learning. Note that the estimating unit 208 is not necessarily a necessary component when the controller 1 operates in the learning mode.

The controller 1 according to this embodiment having the above configuration learns a model of machine learning capable of estimating the tension value data $O_t$ of the conveyor belt or the like with respect to the data $I_s$ related to the mechanical configuration, the data $I_W$ related to the workpiece, and the data $I_c$ related to the operating condition in the learning mode. The model created by the learning unit 206 can be used to estimate the tension value of the conveyor belt or the like with respect to the operating state of the industrial machine 3 instead of the tension sensor 4 during actual operation of the industrial machine 3. In addition, the controller 1 estimates the tension value of the conveyor belt or the like of the industrial machine 3 based on the data $I_s$ related to the mechanical configuration, the data $I_W$ related to the workpiece, and the data $I_c$ related to the operating condition in the actual operation mode. For this reason, the tension sensor 4 is unnecessary in the industrial machine 3, and manufacturing and operating costs of the industrial machine 3 can be reduced.

Figure 3:
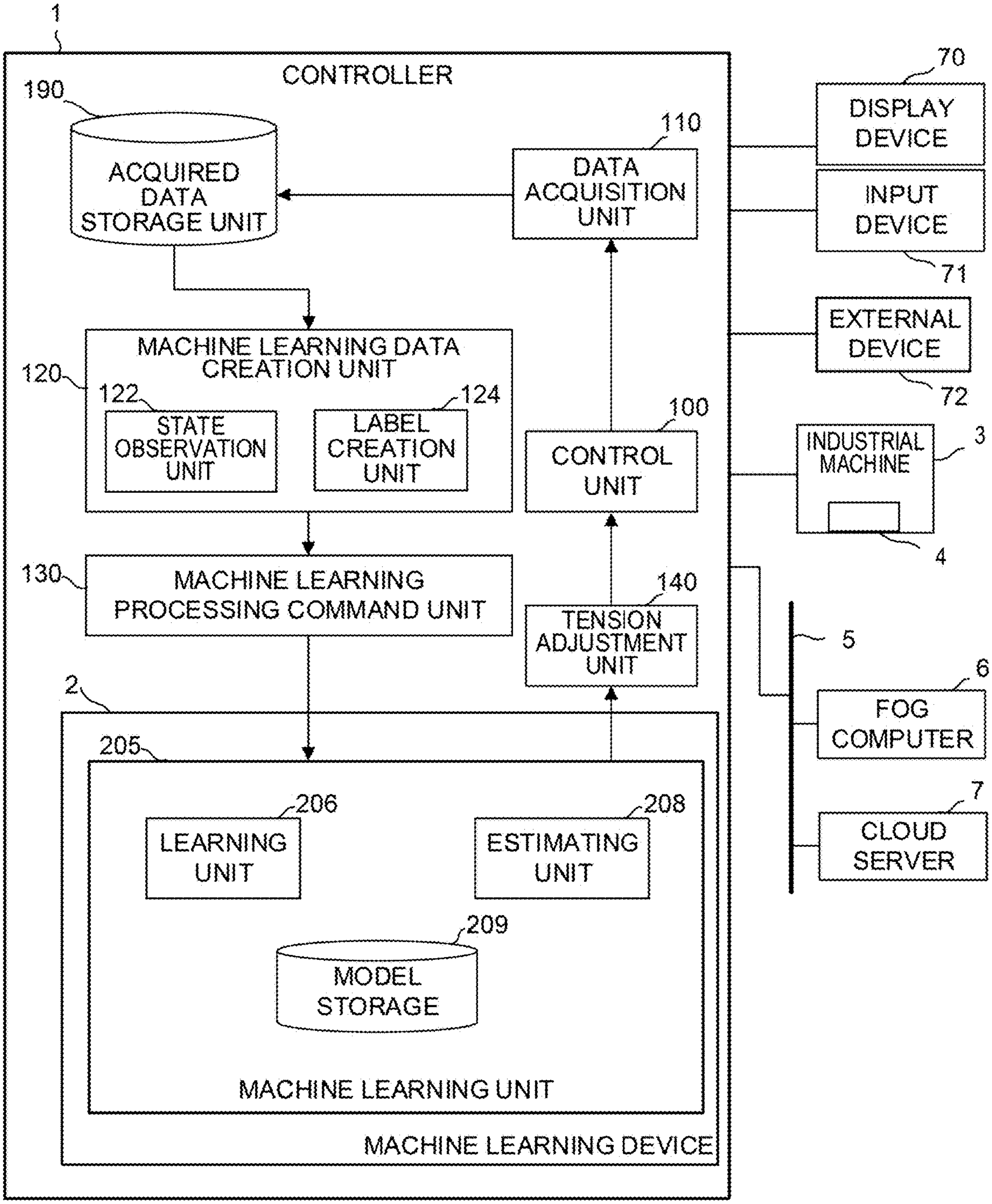
FIG. 3 is a schematic block diagram illustrating functions of a controller according to a second embodiment.

FIG. 3 illustrates functions of a controller 1 according to a second embodiment of the present invention as a schematic block diagram. In this embodiment, the machine learning unit 205 performs supervised learning.

The machine learning data creation unit 120 according to this embodiment includes a state observation unit 122 and a label creation unit 124.

The state observation unit 122 creates state data S indicating the operating state of the industrial machine 3 during operation based on data stored in the acquired data storage unit 190. The state data S indicating the operating state of the industrial machine 3 during operation includes at least the data $I_s$ related to the mechanical configuration, the data $I_W$ related to the workpiece, and the data $I_c$ related to the operating condition.

The label creation unit 124 creates label data L with respect to data created by the state observation unit 122 based on data stored in the acquired data storage unit 190. The label data L includes at least the tension value data $O_t$ of the conveyor belt or the like during operation of the industrial machine 3 when the state data S indicating the operating state of the industrial machine 3 during operation is observed.

When the controller 1 operates in the learning mode, the machine learning data creation unit 120 creates training data T used for processing of machine learning based on the state data S indicating the operating state of the industrial machine 3 during operation created by the state observation unit 122 and the label data L created by the label creation unit 124. The training data T is output to the machine learning processing command unit 130. On the other hand, when the controller 1 operates in the actual operation mode, the machine learning data creation unit 120 outputs the state data S indicating the operating state of the industrial machine 3 during operation created by the state observation unit 122 to the machine learning processing command unit 130 as estimation data.

Further, when the controller 1 operates in the learning mode, the machine learning processing command unit 130 commands the machine learning unit 205 to perform processing of supervised learning based on the training data T. On the other hand, when the controller 1 operates in the actual operation mode, the machine learning processing command unit 130 commands the machine learning unit 205 to estimate the tension value based on the estimation data.

Figure 4:
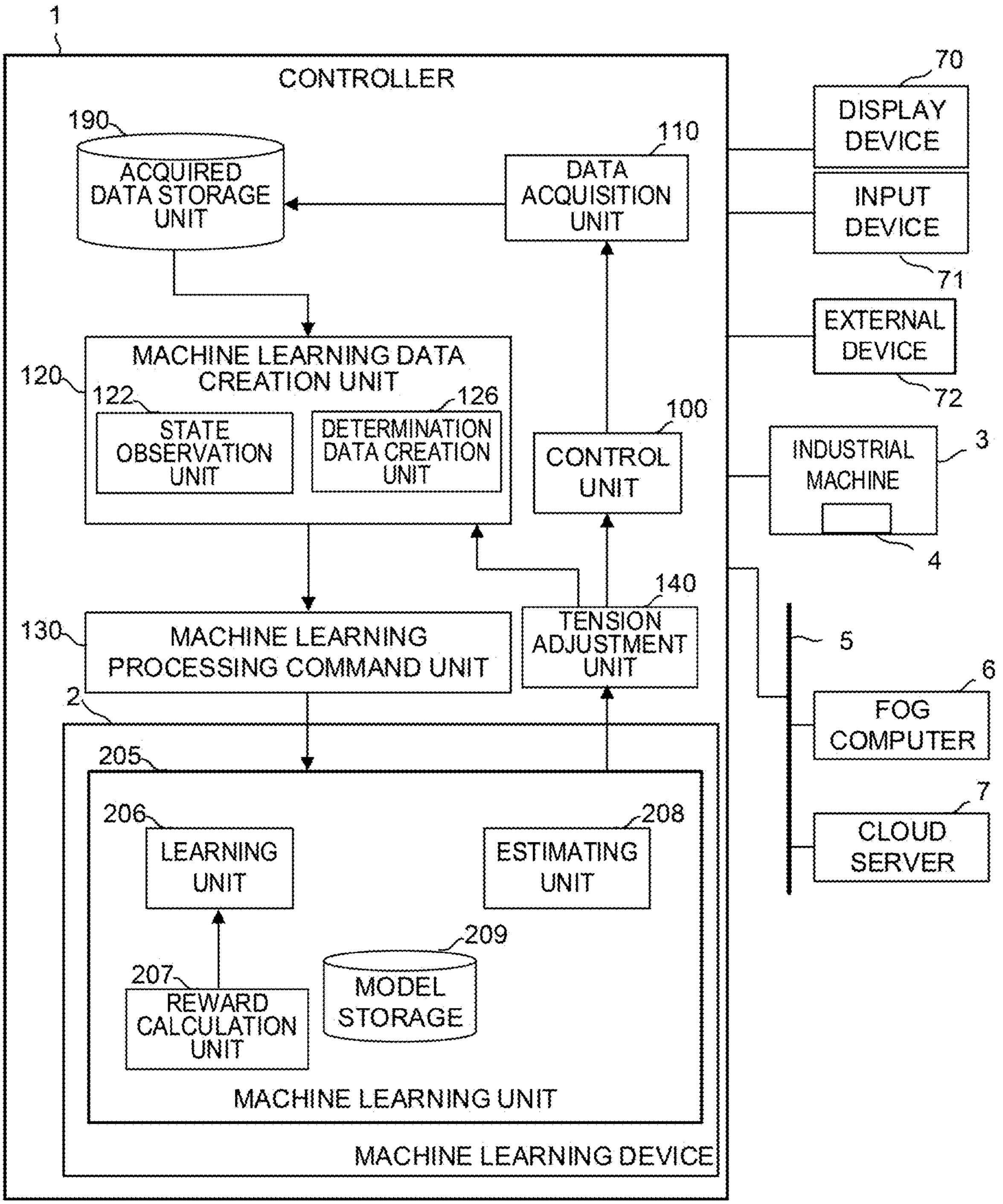
FIG. 4 is a schematic block diagram illustrating functions of a controller according to a third embodiment.

FIG. 4 illustrates functions of a controller 1 according to a third embodiment of the present invention as a schematic block diagram. In this embodiment, the machine learning unit 205 performs reinforcement learning.

The machine learning data creation unit 120 according to this embodiment includes the state observation unit 122 and a determination data creation unit 126.

The state observation unit 122 creates state data S indicating the operating state of the industrial machine 3 during operation based on data stored in the acquired data storage unit 190. The state data S indicating the operating state of the industrial machine 3 during operation includes at least the data $I_s$ related to the mechanical configuration, the data $I_W$ related to the workpiece, and the data $I_c$ related to the operating condition.

The determination data creation unit 126 creates determination data D with respect to data created by the state observation unit 122 based on data stored in the acquired data storage unit 190. The determination data D includes at least a difference between the target tension value and the tension value data $O_t$ of the conveyor belt or the like during operation of the industrial machine 3 after adjustment when the state data S indicating the operating state of the industrial machine 3 during operation is observed and an adjustment action a of a predetermined tension value is taken.

When the controller 1 operates in the learning mode, the machine learning data creation unit 120 creates training data used for processing of machine learning based on the state data S indicating the operating state of the industrial machine 3 during operation created by the state observation unit 122, the adjustment action a of the predetermined tension value, and the determination data D created by the determination data creation unit 126. The created training data is output to the machine learning processing command unit 130. On the other hand, when the controller 1 operates in the actual operation mode, the machine learning data creation unit 120 outputs the state data S indicating the operating state of the industrial machine 3 during operation created by the state observation unit 122 to the machine learning processing command unit 130 as estimation data.

Further, when the controller 1 operates in the learning mode, the machine learning processing command unit 130 commands the machine learning unit 205 to perform processing of reinforcement learning based on training data. On the other hand, when the controller 1 operates in the actual operation mode, the machine learning processing command unit 130 commands the machine learning unit 205 to estimate an adjustment action of a tension value based on estimation data.

The machine learning unit 205 according to this embodiment includes a reward calculation unit 207 in addition to the learning unit 206 and the estimating unit 208.

The learning unit 206 executes reinforcement learning for learning whether the operation state of the industrial machine 3 is good or bad when the adjustment action a of the predetermined tension value is taken based on training data received from the machine learning processing command unit 130. Reinforcement learning learns the success or failure of a result when a predetermined action is performed with respect to a current state of a learning target in the form of a reward indicating a value of the action. By repeating a learning cycle of reinforcement learning in a trial-and-error manner, a policy that maximizes a total reward (the adjustment action of the tension value with respect to the operating state of the industrial machine 3) is learned as an optimal solution. Examples of a method of reinforcement learning include Q-learning or the like. In this case, the learning unit 206 may create, for example, a regression learning unit, a neural network, or the like as a value function Q (model) in reinforcement learning.

The reward calculation unit 207 is realized by the processor 201 provided in the machine learning device 2 illustrated in FIG. 1 executing a system program read from the ROM 202 and mainly performing arithmetic processing using the RAM 203 and the nonvolatile memory 204. The reward calculation unit 207 calculates a predetermined reward R indicating a value of a predetermined action with respect to the determination data D included in the training data received from the machine learning processing command unit 130, and outputs a calculation result thereof to the learning unit 206. For example, in Q-learning by the learning unit 206, the reward R is set as a positive (plus) reward R as the determination data D is closer to 0 (the tension value data $O_t$ of the conveyor belt or the like during operation of the industrial machine 3 matches the target tension value), and is set as a negative (minus) reward R as the determination data D is farther from 0.

The estimating unit 208 estimates an adjustment action command of a tension value using a model stored in the model storage 209 based on estimation data received from the machine learning processing command unit 130. The estimating unit 208 calculates a reward for each of adjustment actions $a_i$ (i being 1 to n) of a plurality of tension values that can be taken at present in a state in which the state data S related to the operating state of the industrial machine 3 included in estimation data is observed using a model generated by reinforcement learning by the learning unit 206, and estimates an adjustment action a of a tension value with which a largest reward is calculated as an optimum solution. An adjustment action command of the tension value estimated by the estimating unit 208 is output to the tension adjustment unit 140.

Even though one embodiment of the invention has been described above, the invention is not limited only to the above-described embodiment, and can be implemented in various aspects by making appropriate modifications.

For example, the above-described embodiment illustrates an example in which the data $I_s$ related to the mechanical configuration, the data $I_W$ related to the workpiece, and the data $I_c$ related to the operating condition are used as the data related to the operating state of the industrial machine 3. However, data obtained by adding data $I_e$ related to an operating environment of the industrial machine 3 to this type of data may be used as the data related to the operating state of the industrial machine 3. Examples of the data $I_e$ related to the environment include environmental temperature and environmental humidity. When the environmental temperature changes, the hardness, toughness, rigidity, or the like of the members used in the conveying section are affected. In addition, when the environmental humidity changes, friction between the conveying section and other parts is affected. For this reason, by handling the data $I_e$ related to these environments, it becomes possible to adjust the tension with higher accuracy.

Figure 5:
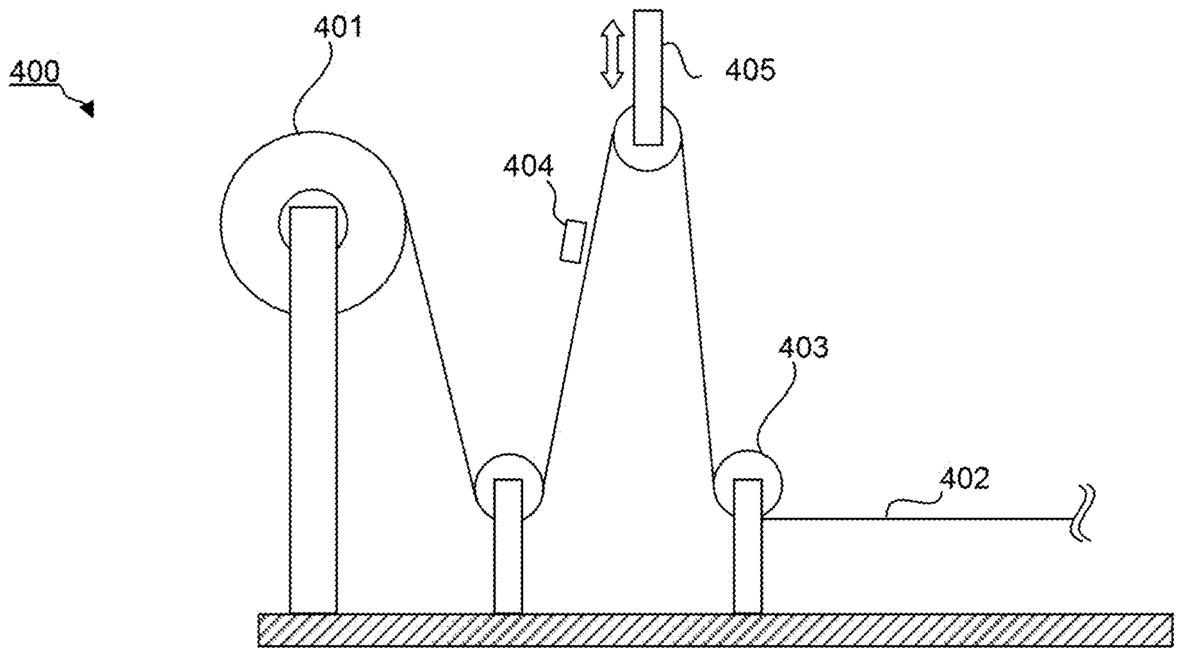
FIG. 5 is a diagram illustrating an example of an industrial machine that conveys a workpiece on a thin film.

In addition, in the above-described embodiment, the conveying machine such as the belt conveyor is illustrated as the industrial machine 3. However, for example, as illustrated in FIG. 5, it can also be applied to a machine 400 that feeds out a thin-film workpiece 402. In the machine 400 as illustrated in FIG. 5, the workpiece 402 itself serves as the conveying section. In general, with regard to the thin-film workpiece 402 such as a film, the workpiece 402 is fed out through a plurality of rollers 403 from a workpiece roller 401. Then, tension is adjusted by a tension adjusting mechanism 405 so that slip does not occur between the workpiece 402 and the rollers 403 and an excessive load is not applied to the workpiece 402 while tension applied to the workpiece 402 is detected by a tension sensor 404. By applying the controller 1 according to the claimed invention to such a machine, it becomes possible to perform tension adjustment without using the tension sensor 404.

EXPLANATIONS OF LETTERS OR NUMERALS

1 CONTROLLER
3 INDUSTRIAL MACHINE
4 TENSION SENSOR
5 NETWORK
6 FOG COMPUTER
7 CLOUD SERVER
11 CPU

12 ROM
13 RAM
14 NONVOLATILE MEMORY
15, 17, 18, 20, 21 INTERFACE
16 PLC
19 I/O UNIT
22 BUS
30 AXIS CONTROL CIRCUIT
40 SERVO AMPLIFIER
50 SERVOMOTOR
70 DISPLAY DEVICE
71 INPUT DEVICE
72 EXTERNAL DEVICE
100 CONTROL UNIT
110 DATA ACQUISITION UNIT
120 MACHINE LEARNING DATA CREATION UNIT
130 MACHINE LEARNING PROCESSING COMMAND UNIT
140 TENSION ADJUSTMENT UNIT
2 MACHINE LEARNING DEVICE
201 PROCESSOR
202 ROM
203 RAM
204 NONVOLATILE MEMORY
205 MACHINE LEARNING UNIT
206 LEARNING UNIT
207 REWARD CALCULATION UNIT
208 ESTIMATING UNIT
209 MODEL STORAGE

The invention claimed is:

1. A controller for controlling an industrial machine including a belt-shaped conveying section for conveying a workpiece by driving a roller, the controller comprising:
a processor configured to acquire data related to a mechanical configuration, data related to a workpiece, and data related to an operating condition related to an operating state of the industrial machine; and
a memory storing data including the data related to the mechanical configuration, the data related to the workpiece, and the data related to the operating condition related to the acquired operating state of the industrial machine;
wherein the processor is configured to:
create machine learning data used for processing of machine learning based on the data stored in the memory;
provide a command to perform processing of machine learning for estimating data related to tension in the conveying section based on created machine learning data;
perform the processing of the machine learning for estimating the data related to the tension in the conveying section based on the command; and
adjust the tension in the conveying section based on the estimated data related to the tension.

2. The controller according to claim 1, wherein:
the processor is configured to:
acquire tension value data in the conveying section,
create state data including the data related to the mechanical configuration, the data related to the workpiece, and the data related to the operating condition based on the data stored in the memory,
create label data including the tension value data in the conveying section based on the data stored in the memory,
perform processing of learning for creating a model for estimating the data related to tension in the conveying section as processing of the machine learning based on the created state data and the created label data, and
create a model of supervised learning for learning a correlation of a tension value of the conveying section with the data related to the operating state of the industrial machine based on the created state data and the created label data; and
the memory stores the created model.

3. The controller according to claim 1, wherein:
the processor is configured to:
create state data including the data related to the mechanical configuration, the data related to the workpiece, and the data related to the operating condition based on the data stored in the memory;
perform processing of estimating the data related to tension in the conveying section as processing of the machine learning based on the created state data;
estimate a tension value of the conveying section using a model of supervised learning having learned a correlation of a tension value of the conveying section with the data related to the operating state of the industrial machine based on the created state data; and
adjust the tension in the conveying section based on the estimated tension value of the conveying section.

4. The controller according to claim 1, wherein:
the processor is configured to:
acquire tension value data in the conveying section,
create state data including the data related to the mechanical configuration, the data related to a workpiece, and the data related to the operating condition based on the data stored in the memory,
create, based on the data stored in the memory, determination data including a difference between the tension value data in the conveying section after adjustment and a target tension value of the conveying section when an adjustment action of a predetermined tension of the conveying section is taken when the state data is created,
perform, as processing of the machine learning based on the created state data and the created determination data, processing of learning for creating a model for estimating the data related to tension in the conveying section and processing of estimating an adjustment action of tension of the conveying section,
calculate a reward indicating a value of the adjustment action of the predetermined tension of the conveying section based on the created determination data;
create a model of reinforcement learning for learning a value of the adjustment action with respect to the operating state of the industrial machine based on the created state data and the calculated reward;
estimate an adjustment action of tension of the conveying section using a model of reinforcement learning stored in the memory based on the created state data; and
adjust the tension in the conveying section based on the estimated adjustment action of tension of the conveying section.

5. The controller according to claim 1, wherein:
the processor is configured to:
create state data including the data related to the mechanical configuration, the data related to the workpiece, and the data related to the operating condition based on the data stored in the memory;
perform processing of estimating an adjustment action of tension of the conveying section as processing of the machine learning based on the created state data;

estimate an adjustment action of tension of the conveying section using a model of reinforcement learning having learned a value of an adjustment action of tension of the conveying section with respect to the operating state of the industrial machine based on the created state data; and adjust the tension in the conveying section based on the estimated adjustment action of tension of the conveying section.

* * * * *